United States Patent Office 3,346,490
Patented Oct. 10, 1967

3,346,490
HEAT RESISTANT BEARING PRODUCT
Franklin W. Eschen, Martinsville, N.J., assignor to Johns-Manville Corporation, New York, N.Y., a corporation of New York
No Drawing. Filed July 15, 1963, Ser. No. 295,225
16 Claims. (Cl. 252—12.4)

This invention relates to journal bearings or bushings, and more particularly to improved bearings and bushings for continuous operation under conditions of elevated temperatures, the compositions and method of producing the same.

There are a number of journal bearing and bushing products on the market as well as a great variety of known materials and/or compositions to draw from which are suitable for the manufacture of bearings and bushings of general or assorted specialized applications. Nevertheless, these typical materials or compositions are generally not suited for prolonged continuous operation under conditions of high temperatures and the materials which are known to endure extended or constant high temperatures such as graphite are frequently costly in material and/or fabrication, or wanting in physical properties such as strength, wear rates, good frictional coefficients or characteristics, etc.

It is a primary object of this invention to provide journal bearings and bushings of compositions which are low cost in both materials and production and will continuously function effectively under any steady or fluctuating temperature conditions ranging from ambient up to in excess of 800° F.

It is a further object of this invention to provide compositions and bearing or bushing products composed thereof which are economical, have good physical or strength properties, low wear rates and low coefficients of friction, operate continuously without any external lubrication, and are effective at all temperatures ranging up through 800° F. without adverse or diminutive effect upon their good strength, wear rates, friction coefficients, and self-lubricating properties.

It is a still further object of this invention to provide non-metallic journal bearings and bushings having good bearing qualities which withstand extreme thermal shock and are unaffected by extended and rigorous temperature conditions rendering the same particularly adaptable and suitable for use in and about high temperature installations such as curing and/or drying and the like, ovens, furnaces, etc.

These and other objects and advantages of this invention will become more apparent from the hereinafter detailed description.

This invention comprises inorganic bonded, temperature resistant bearing and bushing materials or compositions containing effective amounts of hydraulic setting, temperature resistant binder consisting of Portland cement and/or high alumina (calcium aluminate) cement in combination with graphite, asbestos fiber and thermosetting resin. The bearings of this invention comprise combinations of such components in the given proportions which have been found to cooperate or coact to effect the foregoing properties. The required proportions of these essential constituents are as follows in approximate percentages by weight:

|  | Broad Range, Percent | Preferred Range, Percent |
|---|---|---|
| Portland or high alumina cement | 15 to 35 | 20 to 28. |
| Graphite | 30 to 78 | 45 to 60. |
| Asbestos fiber | 5 to 15 | 10 to 12. |
| Thermosetting resin | 2 to 20 | 5 to 35. |

The thermosetting resin component comprises phenolic, furfuryl, epoxy, and the like relatively heat resistant thermosetting resins, for example "Durez" 9624, Durez Plastics Division, Hooker Electrochemical Co., a phenol formaldehyde resin; BRP 4401, Union Carbide and Carbon Corp., a phenol formaldehyde resin; "Durez" 16470, Durez Plastics Division, Hooker Electrochemical Co., a furfuryl alcohol resin; and "Oxiron" 2002, Food Machinery & Chemical Corp., an epoxy resin, respectively. When appropriate, the resinous component may include a suitable catalyst to facilitate or enable the cure.

In general, the bearings or bushings of this invention are produced by blending the dry ingredients, as for example in a rotary drum or spike-type mixer, either with or without the resin component, then water is added, preferably in amounts of aprproximately 10 to 35% by weight of the dry batch to provide a wet and thereby more moldable or plastic mixture of stock and to hydrate the hydraulic cementitious material. The conformable wet mix or stock is then cold pressed to impart the desired bearing or bushing configuration or component thereof. A mold designed to exert uniform positive pressure and constructed to permit water to leave the stock while under pressure is highly desirable in this operation, facilitating the molding step or process, and pressures of approximately 1000 to 10,000 p.s.i. are generally suitable, but pressures within the range of about 2,000 to 5,000 p.s.i. typically suffice. Mold dwell time varies with the part or unit size molded but normally ranges from about 10 to 30 seconds. The wet, molded or consolidated and shaped articles are cured in conditions of high humidity of at least about 50%, and preferably in excess of about 75% at ambient temperatures such as approximately 50 to 90° F. over a period of typically about 12 to 36 hours to hydrate and cure the hydraulic cementitious component. This hydration step is followed by air drying under ambient conditions for at least about 12 hours and preferably about 24 hours. Further drying and/or a final cure can be achieved and/or accelerated in air circulating ovens.

As indicated hereinbefore, the resinous component may be included in the initial batch or applied subsequently. When the resin is incorporated in the initial batch, it may be added as a powder with the dry ingredients, or it may be applied subsequently in solution, including an aqueous solution, dispersion or emulsion thereof, and/or simply as a component of the plasticizing and hydrating water. Following the hydration of the cement, suitable and appropriate curing conditions for products molded with the resinous component integrated therein comprise, for example, heating the hydrated and thoroughly dried article to about 180° F. and maintaining the same for approximately 14 hours, followed by about 2 hours to approximately 350° F. and about 4 hours at approximately 350° F. The thermal conditions for curing the thermoseting resin, however, should meet the requirements of the particular resin composition employed which conditions are available in the literature or from the vendor. When including the resin in the premolded batch, suitable formulations comprise approximately:

|  | Percent by Weight | |
|---|---|---|
|  | Range | Example |
| Hydraulic cement (Portland or calcium aluminate) | 14 to 25 | 18 |
| Graphite | 20 to 70 | 42 |
| Asbestos fiber | 5 to 13 | 10 |
| Thermosetting resin | 2 to 17 | 12 |
| Water | 9 to 25 | 18 |

An alternative and frequently preferred means of producing the products of this invention comprise blending and molding the hydraulic cement, graphite and fiber components as set forth above and following the stated hydration and air drying step, oven drying the articles to eliminate substantially all traces of moisture, as for example about 20 hours at approximately 260 to 280° F. and immediately upon completing said drying or upon otherwise maintaining the dried articles in a moisture-free condition, impregnating the same with a resin solution to introduce the thermosetting resin throughout the mass of the molded articles in amounts of about 2 to 20% by weight thereof. Suitable impregnations may comprise immersing the molded articles in approximately 40 to 60% resin solids solution for about one hour or more effecting a resin solids pick-up of about 2 to 20% by weight, followed by a typical thermal curing as for example approximately 6 hours to about 300° F. and then approximately 8 hours at about 300° F. With this latter procedure formulations for a suitable moldable resin free batch comprise approximately:

|  | Percent by weight | |
| --- | --- | --- |
|  | Range | Example |
| Hydraulic cement (Portland or calcium aluminate) | 15 to 30 | 20 |
| Graphite | 25 to 70 | 50 |
| Asbestos fiber | 5 to 15 | 10 |
| Water | 10 to 30 | 20 |

The resinous component is subsequently applied to the molded article in the prescribed proportion of about 2 to 20%, or for example 8%, by weight of the article by impregnation.

Upon completing the cure of the thermosetting resin introduced by either of the foregoing techniques, the molded bearings or components thereof are ready for machining to final tolerances.

The following comprises a specific illustration or example of a preferred and typical product and means of this invention and demonstrates the pronounced advantageous effects and properties thereof. It is to be appreciated, however, that the specific formulation and/or means employed or given are primarily exemplary and are not to be construed as limiting the invention to any composition(s) or method(s) or data recited hereinafter.

A mold stock comprising:

|  | Percent by Weight | Batch in Pounds |
| --- | --- | --- |
| High alumina hydraulic calcium aluminate cement* (Lumnite—Universal Atlas Cement Div., United States Steel Corp.). | 25.0 | 6 lbs. 4 oz. |
| Graphite (U.S.G. No. 205) | 61.8 | 15 lbs. 7 oz. |
| Asbestos fiber, grade 7D | 13.2 | 3 lbs. 5 oz. |
|  | 100.0 |  |

* Composition of Lumnite cement employed:

|  | Percent by Weight |
| --- | --- |
| $Al_2O_3 + TiO_2$ | 42.6 |
| CaO | 36.6 |
| FeO, $Fe_2O_3$ | 10.8 |
| $SiO_2$ | 8.8 |
| MgO | 1.1 |
| $SO_3$ | 0.2 |
| Residue | 0.52 | was dry mixed 30 minutes in a sigma blade mixer whereupon water in amount of 25% of the batch, or 6 lbs. 4 oz., was sprayed into the mixer and mixing was continued for 2 minutes. Bushings were formed of this stock by pressing in a mold exerting uniform positive pressures at 5000 p.s.i. for a dwell period of about 10 seconds. The pressed articles were stored at room temperature (about 70° F.) in a damp atmosphere having a humidity of at least approximately 75% for about 16 hours to facilitate hydration of the cement. This was followed by placing the articles in an oven at approximately 260° F. for a minimum of 16 hours. Substantially immediately upon removal from the oven the bushings were placed in a 40% solids solution of phenol formaldehyde resin (Durez 9624, Durez Plastics Division, Hooker Electrochemical Co.) in ethanol and retained therein for about one hour. The resin solids pick-up on a dry weight basis ranged from approximately 5 to 8% of the total article. After draining 2 hours the molded bushings were thermally cured by subjecting the same to about 7 hours to approximately 300° F. and about 8 hours at approximately 300° F. The final articles or bushings had a calculated dry composition, in approximate percentage by weight, of 23 to 24% hydraulic cement, 57 to 59% graphite, 12% asbestos fiber, and 5 to 8% of resin.

Upon trimming and grinding these bushings to dimensions and tolerances 1½ in. I.D. x 2½ in. O.D. x 2 in. long) they were compared to a commercial product of like dimensions designed for high temperature applications and consisting of graphite. The following comparative test data which were obtained under identical conditions comprise a determination of the coefficients of friction and rates of wear at 750° F. and a pressure velocity [1] condition of 1000.

|  | Products of Example I | Graphite Product |
| --- | --- | --- |
| Specific gravity | 1.75 | 1.70 |
| Bushing test (750° F. × 1,000 PV): |  |  |
| Coefficient of friction | 0.35 | 0.37 |
| Wear (cu. in./hr. × $10^4$) | 4.8 | 6.8 |

It is to be understood that throughout the appended claims the words or terms "bearing" or "journal bearing" are intended to include "bushings," "bearing inserts," "bearing wear plates," "bearing sections" or "bearing wear plate sections or inserts," and the like elements which support moving components.

The foregoing details are given for the purpose of illustration and not restriction and that variations within the spirit of the invention are to be included within the scope of the appended claims.

I claim:
1. A heat resistant bearing having a low coefficient of friction at temperatures ranging from ambient up through 800° F. consisting essentially of in percent by weight, approximately 15 to 35% of at least one hydraulic setting calcareous binder selected from the group consisting of Portland cement and calcium aluminate cement, approximately 30 to 78% of graphite, approximately 5 to 15% of asbestos fiber, and approximately 2 to 20% of heat resistant thermosetting resin.

2. A heat resistant bearing having a low coefficient of friction at temperatures ranging from ambient up through 800° F. consisting essentially of in percent by weight, approximately 23% of at least one hydraulic setting calcareous binder selected from the group consisting of Portland cement and calcium aluminate cement, approximately 57% by weight of graphite, approximately 12% of asbestos fiber, and approximately 8% of heat resistant thermosetting resin.

3. A heat resistant bearing having a coefficient of friction of about 0.35 at temperatures ranging from ambient up through 800° F. consisting essentially of in percent by weight approximately 20 to 28% of at least one hydraulic setting calcareous binder selected from the group consisting of Portland cement and calcium aluminate cement, approximately 45 to 60% by weight of graphite, approximately 10 to 12% by weight of asbestos fiber, and approximately 5 to 15% by weight of at least one thermosetting

---

[1] Pressure velocity is an empirical value obtained by multiplying the load on the bushing, expressed as p.s.i. over the projected area, by the shaft velocity in ft./min.

resin selected from the group consisting of phenolic, furfuryl, and epoxy resins.

4. A heat resistant bearing having a low coefficient of friction of about 0.35 at temperatures ranging from ambient up through 800° F. consisting essentially of in percent by weight, approximately 23% of at least one hydraulic setting calcareous binder selected from the group consisting of Portland cement and calcium aluminate cement, approximately 57% of graphite, approximately 12% of asbestos fiber, and approximately 8% of at least one thermosetting resin selected from the group consisting of phenolic, furfuryl, and epoxy resins.

5. The heat resistant bearing of claim 4 wherein the hydraulic setting calcareous binder is high alumina calcium aluminate cement.

6. The heat resistant bearing of claim 5 wherein the thermosetting resin is phenolic resin.

7. A method of manufacturing heat resistant bearings having a low coefficient of friction at temperatures ranging from ambient up through 800° F. comprising the steps of blending components consisting essentially of, in percent by weight, approximately 14 to 25% of at least one hydraulic setting calcareous binder selected from the group consisting of Portland cement and calcium aluminate cement, approximately 20 to 70% of graphite, approximately 5 to 13% of asbestos fiber, approximately 2 to 17% of heat resistant thermosetting resin, and approximately 9 to 25% of water to produce a wet moldable mix, cold pressing the wet mix to consolidate, dewater and shape the same, hydrating the calcareous binder in an atmosphere of at least about 50% relative humidity at temperatures of approximately 50 to 90° F. for approximately 12 to 36 hours, air drying the bearing at ambient conditions for at least about 12 hours, and thermally curing the thermosetting resin.

8. A method of manufacturing heat resistant bearings having a low coefficient of friction at temperatures ranging from ambient up through 800° F. comprising the steps of blending components consisting essentially of, in percent by weight, approximately 14 to 25% of at least one hydraulic setting calcareous binder selected from the group consisting of Portland cement and calcium aluminate cement, approximately 20 to 70% of graphite, approximately 5 to 13% of asbestos fiber, approximately 2 to 17% of heat resistant thermosetting resin, and approximately 9 to 25% of water to produce a wet moldable mix, cold pressing the wet mix to consolidate, dewater and shape the same, hydrating the calcareous binder in an atmosphere of at least about 75% relative humidity at temperatures of about 50 to 90° F. for approximately 12 to 36 hours, air drying the bearing at ambient conditions for at least about 12 hours, then curing the thermosetting resin at a temperature of approximately 180° F. for about 14 hours, then about 2 hours up to approximately 250° F., and approximately 350° F. for about 4 hours.

9. A method of manufacturing heat resistant bearings having a coefficient of friction of about 0.35 at temperatures ranging from ambient up through 800° F. comprising the steps of blending components consisting essentially of, in percent by weight, approximately 18% of at least one hydraulic setting calcareous binder selected from the group consisting of Portland cement and calcium aluminate cement, approximately 42% of graphite, approximately 10% of asbestos fiber, approximately 12% of at least one heat resistant thermosetting resin selected from the group consisting of phenolic, furfuryl, and epoxy resins, and approximately 18% water to produce a wet moldable mix, cold pressing the wet mix to consolidate, dewater and shape the same, hydrating the calcareous binder in an atmosphere of at least about 75% relative humidity at temperatures of about 50 to 90° F. for approximately 12 to 36 hours, air drying at ambient conditions for at least about 18 hours, then curing the thermosetting resin by subjecting the same to elevated temperatures.

10. The method of claim 9 wherein the calcareous binder comprises high alumina calcium aluminate cement and the thermosetting resin comprises phenolic resin.

11. The method of claim 10 wherein the phenolic thermosetting resin is cured by heating at approximately 180° F. for about 14 hours, then about 2 hours up to approximately 250° F., and approximately 350° F. for about 4 hours.

12. A method of manufacturing heat resistant bearings having a low coefficient of friction at temperatures ranging from ambient up through 800° F. comprising the steps of blending, in percent by weight, approximately 15 to 30% of at least one hydraulic setting calcareous binder selected from the group consisting of Portland cement and calcium aluminate cement, approximately 25 to 70% of graphite, approximately 5 to 15% of asbestos fiber, and approximately 10 to 30% of water to produce a wet moldable mix, pressing the wet mix to consolidate, dewater and shape the same, hydrating the calcareous binder in an atmosphere of at least about 50% relative humidity at temperatures of about 50 to 90° F. for approximately 12 to 36 hours, drying the bearing at elevated temperatures to substantially eliminate the residual moisture, then impregnating the bearing in a solvent cut thermosetting resin solution effecting a resin solids content throughout the bearing in amount of approximately 2 to 20% thereof, and thermally curing the thermosetting resin.

13. A method of manufacturing heat resistant bearings having a low coefficient of friction at temperatures ranging from ambient up through 800° F. comprising the steps of blending, in percent by weight, approximately 15 to 30% of at least one hydraulic setting calcareous binder selected from the group consisting of Portland cement and calcium aluminate cement, approximately 25 to 70% of graphite, approximately 5 to 15% of asbestos fiber, and approximately 10 to 30% of water to produce a wet moldable mix, pressing the wet mix to consolidate, dewater and shape the same, hydrating the calcareous binder in an atmosphere of at least about 75% relative humidity at temperatures of about 50 to 90° F. for approximately 12 to 36 hours, air drying the bearing at ambient conditions for at least about 12 hours at elevated temperatures to substantially eliminate the residual moisture, then impregnating the bearing in a solvent cut thermosetting resin solution effecting a resin solids content throughout the bearing in amount of approximately 2 to 20% by weight thereof, and curing the thermosetting resin at temperatures of approximately 180° F. for about 14 hours, then about 2 hours up to approximately 250° F., and approximately 350° F. for about 4 hours.

14. A method of manufacturing heat resistant bearings having a coefficient of friction of about 0.35 at temperatures from ambient ranging up through 800° F. comprising the steps of blending, in percent by weight, approximately 20% of at least one hydraulic setting calcareous binder selected from the group consisting of Portland cement and calcium aluminate cement, approximately 50% of graphite, approximately 10% of asbestos fiber, and approximately 20% of water to produce a wet moldable mix, pressing the wet mix to consolidate, dewater and shape the same, hydrating the calcareous binder in an atmosphere of at least about 75% relative humidity at temperatures of about 50 to 90° F. for approximately 12 to 36 hours, air drying at ambient conditions for at least about 18 hours and at elevated temperatures to substantially eliminate the residual moisture, then impregnating the bearing in a solvent cut thermosetting resin solution effecting a resin solids content throughout the bearing in amount of approximately 5 to 10% by weight thereof, and curing the thermosetting resin by subjecting the same to elevated temperatures.

15. The method of claim 14 wherein the calcareous binder comprises high alumina calcium aluminate cement and the thermosetting resin comprises phenolic resin.

16. The method of claim 15 wherein the phenolic thermosetting resin is cured by heating at approximately 180° F. for about 14 hours, then about 2 hours up to 250° F., and approximately 350° F. for about 4 hours.

References Cited

UNITED STATES PATENTS

| | | | |
|---|---|---|---|
| 1,491,466 | 4/1924 | Dillon | 252—12.6 |
| 2,326,000 | 8/1943 | Teeple | 252—12.4 |
| 2,600,321 | 6/1952 | Pyle | 252—12.2 |
| 2,956,848 | 10/1960 | St. Clair | 252—12 |

FOREIGN PATENTS

| | | |
|---|---|---|
| 698,611 | 10/1953 | Great Britain. |
| 714,946 | 9/1954 | Great Britain. |

DANIEL E. WYMAN, *Primary Examiner.*

I. VAUGHN, *Assistant Examiner.*

UNITED STATES PATENT OFFICE
CERTIFICATE OF CORRECTION

Patent No. 3,346,490                                          October 10, 1967

Franklin W. Eschen

It is hereby certified that error appears in the above numbered patent requiring correction and that the said Letters Patent should read as corrected below.

Column 1, in the table, third column, line 4 thereof, for "5 to 35" read -- 5 to 15 --; column 2, line 16, for "aprpoximately" read -- approximately --; column 4, line 18, for "tolerances 1 1/2 in." read -- tolerances (1 1/2 in. --.

Signed and sealed this 15th day of April 1969.

(SEAL)
Attest:

Edward M. Fletcher, Jr.                                EDWARD J. BRENNER
Attesting Officer                                             Commissioner of Patents